United States Patent [19]

Colpack et al.

[11] 4,328,516
[45] May 4, 1982

[54] INTEGRAL TEST INPUT FOR ELECTRO-OPTICALLY MULTIPLEXED FLIR SYSTEM

[75] Inventors: Michael J. Colpack; Edward Pasko, both of Orlando; Richard W. Johnson, Clearwater, all of Fla.

[73] Assignee: The United States of America as represented by the Secretary of the Army, Washington, D.C.

[21] Appl. No.: 207,567

[22] Filed: Nov. 17, 1980

[51] Int. Cl.³ .............................................. H04N 5/33
[52] U.S. Cl. ................................... 358/113; 358/139; 358/229; 250/330; 250/333
[58] Field of Search .............. 358/113, 222, 221, 163, 358/139, 229; 250/330, 332, 333, 334

[56] References Cited

U.S. PATENT DOCUMENTS 3,718,757  2/1973  Gulitz et al. ......................... 358/113
4,063,093  12/1977  Astheimer et al. ................. 250/333

Primary Examiner—Robert L. Richardson
Assistant Examiner—Edward L. Coles
Attorney, Agent, or Firm—Nathan Edelberg; Robert P. Gibson; William J. Sheehan

[57] ABSTRACT

In a forward-looking infared system of the type in which a cryogenically cooled infared detector array drives a light-emitting array whose video output is focused onto the target of an electro-optical multiplexer, such as a vidicon tube, which drives a CRT display, the video chain may be tested without cool-down of the infared detector. A point-source of light, such as a tungsten lamp mounted forward of and at the side of the vidicon target, is energized to project light onto the target surface at an acute angle, setting up a gradient of light intensity across each of the horizontally scanned lines.

3 Claims, 3 Drawing Figures

U.S. Patent
May 4, 1982
4,328,516
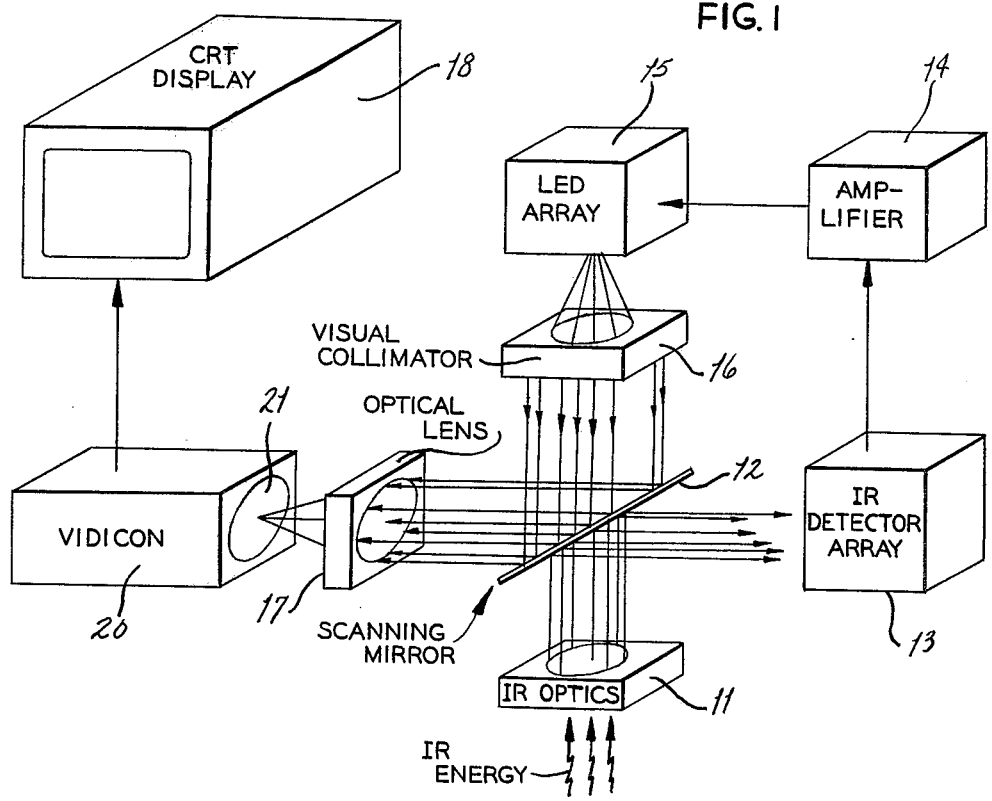
FIG. 1
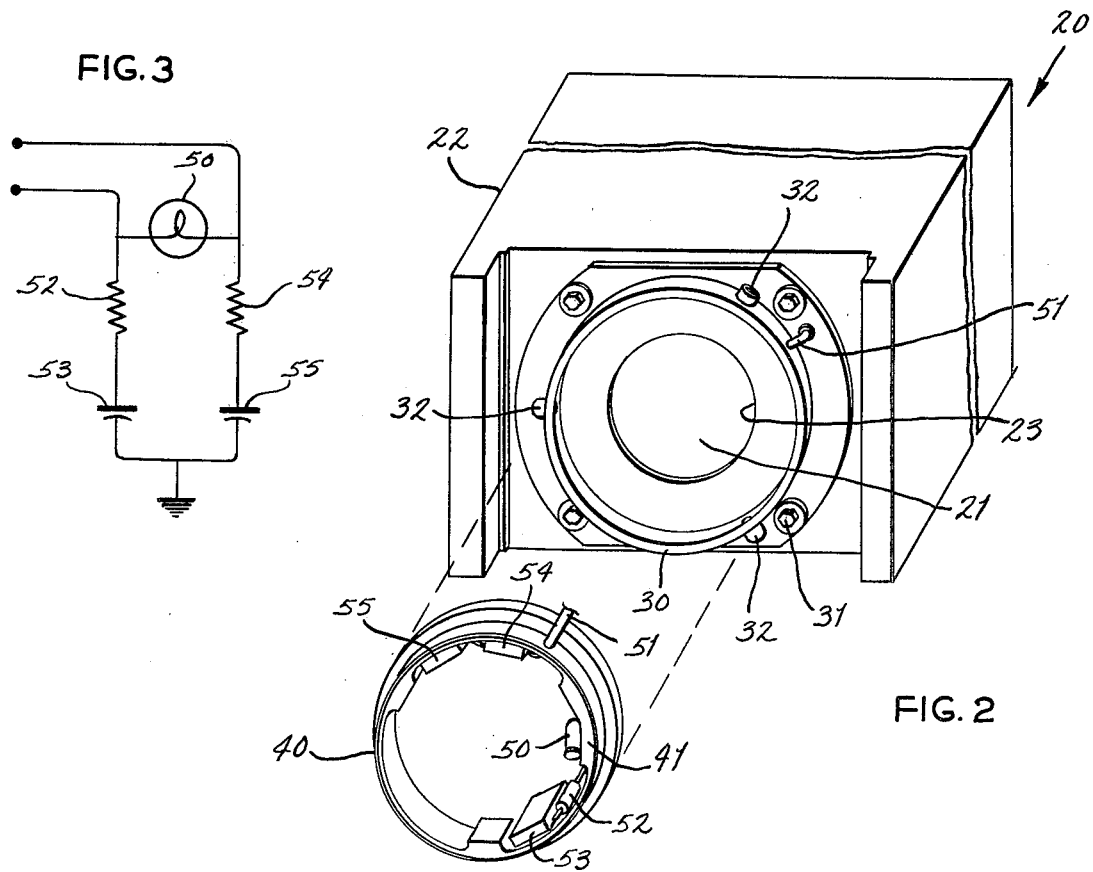
FIG. 3
FIG. 2

INTEGRAL TEST INPUT FOR ELECTRO-OPTICALLY MULTIPLEXED FLIR SYSTEM

BACKGROUND OF THE INVENTION

The present invention relates to forward-looking infared (FLIR) detector systems of the type in which the video display is electro-optically multiplexed to an infared detector by a video scanner optically coupled to a light-emitting array which is responsive to the infared detector. Specifically, the invention relates to means for testing the video chain of such a system without energization of the infared detector.

In the prior art, one type of FLIR system utilizes an infared detector array, for detecting infared energy emanating from a scene, and a light-emitting array, such as an array of LED's, coupled to the detector array to produce a visible image of the detected scene. A line-scanning electro-optical multiplexer receives light focused by coupling optics from the light-emitting array and ultimately drives a video display, such as a CRT. Heretofore, it has been necessary to energize the entire FLIR system to test the video chain. This is extremely time-consuming because the infared detectors are cryogenically cooled and require a long "cool-down" period before reaching a stable operating condition. The principal object of the present invention is to provide a means of testing the video chain of a FLIR system without requiring start-up or operation of the cryogenically-cooled infared detector array.

SUMMARY OF THE INVENTION

The present invention is utilized in a FLIR system of the type, described above, in which the light from a light-emitting array, responsively coupled to an infared detecting array, is focused, by an optical coupling system, on the target of a vertical or horizontal line-scanning electro-optical multiplexer, such as a vidicon tube or image intensifier tube, which forms electrical signals from which a CRT video display is produced. A light source is mounted forward of and projecting onto the target of the electro-optical multiplexer and is energized to test the video chain, including the multiplexer and video display, without requiring start-up of the infared detecting array. When the multiplexer is of the horizontal scanning type, the light source is preferably a point-source mounted at one side of the target, so that a gradient of light intensity is set up across substantially each of the horizontally-scanned lines.

BRIEF DESCRIPTION OF THE DRAWINGS

FIG. 1 is a simplified block-form schematic of an electro-optically multiplexed forward-looking infared (FLIR) system.

FIG. 2 is a cabinet projection of a typical vidicon, such as utilized in the FLIR system of FIG. 1, shown with a lamp mounting provision, embodying the present invention, exploded away.

FIG. 3 is a simple wiring diagram for the lamp circuit.

DESCRIPTION OF THE PREFERRED EMBODIMENT

In the present invention, a light source is mounted to project onto the target of the vidicon tube of a forward-looking infared (FLIR) system for testing of the video chain. FIG. 1 shows a simplified schematic of one type of FLIR system utilizing electro-optical multiplexing: Infared (IR) energy emanating from a desired scene is focused by infared optics 11 onto one side of a scanning mirror 12, which reflects the IR energy onto an infared detector array 13, which is a cryogenically cooled device. The scanning mirror 12 is mechanically driven to scan across the desired scene. On start-up of the FLIR system for operation or testing, a considerable time interval, perhaps 15 minutes, is required to "cool down" the infared detector array 13 to a stable operating condition. The detector array 13 detects the IR energy and converts it to electrical signals; these signals are amplified by an amplifier 14 and fed to a light-emitting diode (LED) array 15, whic converts the electrical signals to light in the visible range and produces a pattern corresponding to the infared scene detected.

The light from the LED array 15 is received by an optical coupling system including a visual collimator 16 which converts the diverging light rays projected from LED array 15 into substantially parallel light rays. These parallel rays are reflected by the opposite side of the scanning mirror 12 through an optical lens system 17, which focuses the light onto the light-sensitive target 21 of a vidicon tube assembly 20, described below. The vidicon 20 drives a cathode ray tube (CRT) display 18 which displays the image received on the target 21 of the vidicon 20. The vidicon 20 and CRT display 18 are together referred to as the video chain.

The vidicon tube assembly 20, sometimes known as a line-scanning electro-optical multiplexer, horizontally scans the image received on its target 21 along a plurality of lines and converts the image to multiplexed electrical signals which may be reconverted by the CRT display 18 to a visual image. As shown in FIG. 2, a typical vidicon tube assembly 20 is mounted in an enclosure 22 having a circular front opening 23 so that the light rays may be projected onto the target 21 of the vidicon tube.

As shown in FIG. 2, the front of the enclosure 22 is provided with an annular forward-projecting mounting support 30, spaced radially outward of the circular front opening 23, mounted by stud bolts 31. The annular mounting support 30 has extending therethrough three spaced-apart, radially-inward projecting setscrews 32.

The annular mounting support 30 receives, on its radially inner side, a lamp-mounting ring 40, shown exploded away in FIG. 2. The ring 40 is fixed within the support 30 by the setscrews 32. An inward projection portion 41 on the radially inner side of the ring 40 supports a lamp 50, which in the preferred embodiment is a tungsten lamp. The lamp 50 is considered as substantially a point-source of light, but in being mounted forward of the target 21, the light scatters across the target 21 so that the lamp 50 does not appear as a point on the video display 18 and the light projects onto the target 21 at an acute angle relative to its surface. The inward projection portion 41 is preferably positioned at the side of the ring 40 so that the light is of varying intensity from side to side; therefore each horizontally scanned line varies intensity along its length. The inward projection portion 41 is of such size to cause the lamp 50 to project light onto the target 21, without blocking light focused from the optical lens system 17 onto the target 21 on normal operation of the FLIR system. The lamp 50 is supplied from within the vidicon assembly 20 via a wire cable 51 extending through the front of the vidicon assembly enclosure 22 and the lamp-mounting ring 40.

One terminal of the lamp 50 is connected to ground through a series combination of a resistor 52 and capacitor 53, and its other terminal is similarly connected to ground by a series resistor 54 and capacitor 55. The resistors 52, 54 and capacitors 53, 55 are epoxied to the radially inner side of the ring 40 and the ground connection is made to the ring 40.

The lamp 50 is energized to test the video chain (the vidicon 20 and CRT display 18) without energizing the infared detector array 13, which requires a long start-up time interval, and without energizing the amplifier 14 and LED array 15. The lamp 50 projects light onto the vidicon target 21 from the side of the target 21. Because the light intensity falls off relatively rapidly as a function of the distance from the tungsten lamp 50, the intensity of the light falling on the target 21 substantially decreases horizontally across the target. This pattern of light intensity should appear on the CRT display 18, indicating proper operation. Placing the lamp 50 at the side of the target 21 is particularly advantageous in this embodiment, because the target 21 is horizontally scanned. A gradient of light intensity set up across each of the horizontally-scanned lines of the display indicates proper operation of the video chain.

The means to energize the lamp 50 may be a power supply within the vidicon 20 with a simple on/off switch, but preferably the FLIR system is provided with a microprocessor-controlled test program which includes an instruction step for energizing the lamp 50 and analyzing the results on the CRT display 18.

The series resistor-capacitor combinations 52, 53, 54, 55 are provided for use where a pulsing supply is utilized for the lamp 50. The resistance and capacitance values are chosen to provide the desired time constant to test the response of the video chain.

Modification of the preferred embodiment will be apparent to persons skilled in the art.

We claim:

1. In a forward-looking infared system of the type including an infared detector array,
    a light-emitting array coupled responsive to the detector array, and
    a video chain having an electro-optical multiplexer whose target receives light from the light-emitting array, and a video display responsive to the electro-optical multiplexer,
    an improvement for testing the operation of the video chain, comprising
    a light source so mounted as to project light onto the target of the electro-optical multiplexer, and
    means to energize the light source when it is desired to test the video chain,
    whereby the video chain may be tested without energizing the infared detector array or light-emitting array.

2. The improvement defined in claim 1, in which the electro-optical multiplexer is of the horizontal line-scanning type, and wherein
    the light source is mounted forward of and at one side of the target of the electro-optical multiplexer,
    whereby, on testing the video chain, a gradient of light intensity, set up across substantially each of the horizontally-scanned lines, indicates proper operation.

3. A forward-looking infared system having a test provision for its video chain, comprising
    an infared detector array for detecting infared energy emanating from a scene,
    a light-emitting array, coupled to the detector array, for producing a visible image corresponding to the scene detected by the detector array,
    coupling optics means to receive and focus the visible image from the light-emitting array,
    a video chain including
    a line-scanning electro-optical multiplexer having a light-sensitive target upon whose surface the visible image of the light-emitting array is focused by the optics means, the multiplexer converting the visible image to electrical signals,
    means to produce a video display from the electrical signals, together with
    a point-source of light, mounted on the electro-optical multiplexer at the forward side of its target, the point-source projecting light onto the target at an acute angle relative to its surface, and
    means to energize the light source when it is desired to test the video chain,
    whereby the light source will appear as a gradient of light intensity over the video display.

* * * * *